(12) United States Patent
Nakajima et al.

(10) Patent No.: US 8,172,463 B2
(45) Date of Patent: May 8, 2012

(54) ROLLING BEARING WITH A CERAMIC COATING AND METHOD FOR MANUFACTURING THE SAME

(75) Inventors: Tatsuo Nakajima, Shizuoka (JP); Kouya Oohira, Mie (JP)

(73) Assignee: NTN Corporation, Osaka (JP)

( * ) Notice: Subject to any disclaimer, the term of this patent is extended or adjusted under 35 U.S.C. 154(b) by 859 days.

(21) Appl. No.: 12/281,580

(22) PCT Filed: Mar. 5, 2007

(86) PCT No.: PCT/JP2007/054155
§ 371 (c)(1),
(2), (4) Date: Sep. 3, 2008

(87) PCT Pub. No.: WO2007/102452
PCT Pub. Date: Sep. 13, 2007

(65) Prior Publication Data
US 2009/0010585 A1    Jan. 8, 2009

(30) Foreign Application Priority Data

Mar. 8, 2006   (JP) .................................. 2006-062603
Mar. 8, 2006   (JP) .................................. 2006-062638

(51) Int. Cl.
*F16C 33/32*   (2006.01)
*B21D 53/10*   (2006.01)

(52) U.S. Cl. .................... 384/492; 384/625; 384/907.1; 29/898.12

(58) Field of Classification Search .......... 384/490–492, 384/494, 625, 907, 907.1, 910; 29/898.13–898.15, 29/898.12, 458, 527.2; 118/308
See application file for complete search history.

(56) References Cited

U.S. PATENT DOCUMENTS

| 7,153,567 | B1 * | 12/2006 | Akedo et al. | 428/323 |
| 7,503,697 | B2 * | 3/2009 | Tsuji et al. | 384/476 |
| 2004/0066997 | A1 * | 4/2004 | Inukai et al. | 384/476 |

FOREIGN PATENT DOCUMENTS

| EP | 1231294 | 8/2002 |
| JP | 01-182621 | 7/1989 |
| JP | 05-52223 | 3/1993 |
| JP | 05-106638 | 4/1993 |
| JP | 07-2799973 | 10/1995 |
| JP | 08-93774 | 4/1996 |
| JP | 10-47355 | 2/1998 |
| JP | 2001-181859 | 7/2001 |
| JP | 2003-183806 | 7/2003 |
| JP | 2003-262231 | 9/2003 |
| WO | WO 01-27348 | 4/2001 |

* cited by examiner

*Primary Examiner* — James Pilkington
(74) *Attorney, Agent, or Firm* — Ditthavong Mori & Steiner, P.C.

(57) ABSTRACT

A rolling bearing is provided that includes an inner ring, an outer ring, and a plurality of rolling elements provided between a raceway surface of the inner ring and that of the outer ring and has a ceramic film formed on at least one surface selected from among an inner peripheral surface of the inner ring and a peripheral surface of the outer ring. The ceramic film is formed by using an aerosol deposition method in which alumina fine particles or the like is used as a material of aerosol. The ceramic film is formed with an aerosol injection nozzle kept stationary and the inner ring or the outer ring being rotated by using a motor for rotating an object, the inner ring or the outer ring is moved axially by using a positioning XY table.

8 Claims, 5 Drawing Sheets

ROLLING BEARING WITH A CERAMIC COATING AND METHOD FOR MANUFACTURING THE SAME

BACKGROUND OF THE INVENTION

1. Technical Field

The present invention relates to a rolling bearing having a ceramic film and more particularly to a rolling bearing excellent in insulation performance and a resistance to corrosion and chemicals such as acids and alkalis and a method for manufacturing the same.

2. Background Art

In a rolling bearing which is used for a main motor of a railway vehicle, when a current collector for grounding electric current of the main motor from wheels to a rail is incomplete, the electric current of the main motor flows between the wheels and the rail through inner and outer rings of the rolling bearing and rolling elements thereof. At this time, a discharge is generated between the rolling elements of the rolling bearing and an outer ring rolling surface or an inner ring rolling surface to generate galvanic corrosion at a discharged portion.

As a means for effectively preventing such a galvanic corrosion, it is known that a thermal spray deposit of an insulator such as ceramics is formed on an outer surface of a bearing ring.

Chemical plant equipment such as a plant for producing macromolecular materials, an apparatus for producing liquid crystal films, and the like has various treating apparatuses using various kinds of acids, alkalis, and the like. Rolling bearings used for stirring and feeding use have a problem that they have a comparatively short life because materials composing the bearings contact various kinds of chemicals such as acids, alkalis, and the like and have deterioration such as corrosion, swell, dissolution, decomposition, and the like. Corrosion-resistant and chemical-resistant stainless steel, ceramics, resin, and the like are used for an inner ring, an outer ring, rolling elements, and a retainer. But the stainless steel is not universal and the kind of chemicals such as acids, alkalis, and the like to which the stainless steel can be applied has a limitation. The ceramics have a high resistance to corrosion and chemicals such as acids, alkalis, and the like, but are expensive.

The resin is widely used in recent years in the field of corrosive environment and environment in which various chemicals are used by selecting kinds having a mechanical strength and slidable property and selecting kinds resistant to corrosion and chemicals such as acids, alkalis, and the like.

Conventionally as rolling bearings made of synthetic resin, a rolling bearing (see patent document 1) in which at least an outer ring is made of polyimide, a rolling bearing (see patent document 2) whose bearing ring is made of polyarylene sulfide resin such as polyphenylene sulfide (hereinafter referred to as PPS) having a flexure elastic modulus of 2000 to 6000 MPa, a rolling bearing (see patent document 3) in which lubricating film consisting of polytetrafluoroethylene (hereinafter referred to as PTFE) is formed on the surface of an inner ring and the outer ring where rolling friction or sliding friction is generated are known.

In addition, a rolling bearing (see patent document 4) is known. In the rolling bearing, a film-forming member containing crystalline high-molecular-weight PTFE resin is pressed against the surfaces of components, composing the rolling bearing, on which rolling friction or sliding friction is generated so that both components slide on each other to form a solid lubricating film of the PTFE resin on the surfaces of the components.

But the rolling bearing in which the rolling surface of the inner ring or that of the outer ring is made of resin is inferior to the rolling bearing in which the rolling surface of the inner ring or that of the outer ring is made of steel in resistance to load. By rolling of rolling elements harder than the resin forming the rolling surface, the rolling surface is worn outstandingly and the durability of the rolling bearing is insufficient. Therefore the use of this rolling bearing made of resin is restricted.

As a method for imparting corrosion-resistant and chemical-resistant property to the inner ring and the outer ring made of steel, a method of forming a thermal spray deposit consisting of ceramics or the like having the corrosion-resistant and chemical-resistant property on the outer surface of the bearing ring is known.

But in the method of forming the ceramic layer on the outside surface of the bearing and the end panel thereof by using a thermal spraying technique, to prevent the occurrence of heat-caused tempering of the bearing steel hardened by heat treatment at the time of thermal spraying treatment, it is necessary to form the ceramic layer while a workpiece is being cooled. Thus this method is complicated and has a low productivity. In addition, to form the ceramic layer on the outside surface of the bearing and the end panel thereof by using the thermal spraying method, it is necessary to thermally spray a nickel aluminum layer and the like as a foundation treatment, which causes the deterioration of productivity.

On the other hand, because the ceramic layer obtained by the thermally spraying method is porous, water penetrates into the ceramic layer owing to dew or the like. As a result, the insulation resistance or the resistance to corrosion and chemicals deteriorates. Therefore it is necessary to prevent the penetration of water by sealing pores inside the ceramic layer. As the pore-sealing treatment method, a method (see patent document 5) of using a pore-sealing agent containing at least one kind of a substance selected from the group of synthetic resin, a polymerizable organic solvent, a fluorine-based surface active agent, and an organic silicon compound containing perfluoro group is known. In another known method (see patent document 6), pores are sealed by forming an upper and a lower layer in combination. Pores of the lower layer are sealed with insulating resin having a preferable permeability, whereas pores of the upper layer are sealed with insulating resin having an incomplete permeability. But in using these pore-sealing treatment methods, the manufacturing cost is very high.

In the ceramic layer obtained by the thermally spraying method, even though $\alpha$ alumina is used as the material powder to obtain insulation performance, it transforms into $\gamma$ alumina having an inferior insulation performance because the thermally spraying step is performed at a high temperature. Therefore this method is required to secure the insulation performance by thickening the film, which causes the manufacturing cost to be high.

Patent document 1: Japanese Patent Application Laid-Open No. 7-279973

Patent document 2: Japanese Patent Application Laid-Open No. 10-47355

Patent document 3: Japanese Patent Application Laid-Open No. 8-93774

Patent document 4: Japanese Patent Application Laid-Open No. 5-106638

Patent document 5: Japanese Patent Application Laid-Open No. 2003-183806

Patent document 6: U.S. Pat. No. 3,009,516

SUMMARY OF THE INVENTION

Problems to be Solved by the Invention

The present invention has been made to cope with the above-described problem. It is an object of the present invention to form a dense ceramic layer by using a method instead of a thermally spraying method to provide a rolling bearing excellent in insulating property and resistance to corrosion and chemicals such as acids, alkalis, and the like.

Means for Solving the Problems

A rolling bearing of the present invention includes an inner ring, an outer ring, and a plurality of rolling elements provided between a raceway surface of the inner ring and that of the outer ring and has a ceramic film formed on at least one surface selected from among an inner peripheral surface of the inner ring and a peripheral surface of the outer ring, wherein the ceramic film is formed by using an aerosol deposition method (hereinafter referred to as AD method).

In the rolling bearing of the present invention, the ceramic film is formed on such portions in a surface of the inner ring including the inner peripheral surface and in a surface of the outer ring including the peripheral surface that the portions contact at least a corrosive substance; and a sealing member is provided at openings disposed at both ends of the inner ring and the outer ring in an axial direction thereof.

The ceramic film is formed at a portion where the sealing member contacts the inner ring and the outer ring.

In the present invention, the resistance to corrosion and chemicals means a property that a material does not have deterioration such as corrosion, swell, dissolution, decomposition, and the like when the material contacts chemicals (corrosive substance) such as acids, alkalis, and the like.

The ceramic film is formed by using alumina fine particles as a material of aerosol.

An average diameter of the alumina fine particles is 0.01 µm to 2 µm. In the present invention, the average diameter thereof is measured by a laser-type particle size analyzer "Microtrack MT3000" produced by Nikkiso Co., Ltd.

The thickness of the ceramic film is 4 µm to 200 µm.

The method of the present invention for manufacturing a rolling bearing is a method for manufacturing a rolling bearing comprising an inner ring, an outer ring, and a plurality of rolling elements provided between a raceway surface of the inner ring and that of the outer ring. The method includes a step of forming a ceramic film on at least one surface selected from among an inner peripheral surface of the inner ring and a peripheral surface of the outer ring by using an AD method.

The ceramic film is formed by using the aerosol deposition method, with an aerosol injection nozzle being kept stationary and the inner ring or the outer ring being rotated by using a motor for rotating an object, the inner ring or the outer ring is moved axially by using an positioning XY table. When the length of the nozzle orifice is set not less than the bearing width of the outer ring, it is possible to form a film without using the XY table.

Effect of the Invention

In the rolling bearing of the present invention, because the ceramic film is formed on at least one surface selected from among the inner peripheral surface of the inner ring and the peripheral surface of the outer ring by using the AD method, it is possible to obtain the dense ceramic film in which the surface of the film and the foundation of the bearing ring are not interconnected with each other at a room temperature and maintain a high insulation performance.

Because in the AD method, the α alumina to be formed as a film is not exposed to a high temperature. Thus without transforming α alumina into γ alumina, in the AD method, it is possible to obtain the film of the α alumina having a high insulation performance.

In the rolling bearing of the present invention, the ceramic film is formed by the AD method on such portions in a surface of the inner ring including the inner peripheral surface and in a surface of the outer ring including the peripheral surface that the portions contact at least a corrosive substance. Thus the rolling bearing can be provided with the dense ceramic film whose surface is not interconnected with the foundation of the bearing ring at a room temperature and is capable of maintaining a high resistance to corrosion and chemicals.

Inside the vacuum chamber or the like, the motor for rotating the shaft is mounted on the positioning XY table, the aerosol injection nozzle is fixed, the outer ring of the bearing or the inner ring thereof is moved axially with the inner ring or the outer ring being rotated. Therefore the ceramic film can be uniformly formed on the predetermined curved surface of the inner ring of the rolling bearing and the outer ring thereof. When the length of the nozzle orifice is set not less than the bearing width of the outer ring, it is possible to form a film without using the XY table. By depositing films on the predetermined surface of the inner ring of the rolling bearing or that of the outer ring thereof one over the other while the inner ring or the outer ring are being rotated, it is possible to form the ceramic film dense and as thin as several micrometers to several tens of micrometers in a favorable adhesion to the predetermined surface of the inner ring or that of the outer ring. In addition, it is unnecessary to cool a workpiece, perform a foundation treatment with nickel, aluminum or the like, and seal pores. Thus the manufacturing cost is very inexpensive.

The surface of the inner ring and that of the outer ring are coated with the thin ceramic layer, the ceramic layer has a higher hardness than the film of PTFE resin or the like. Thus the ceramic layer has a high resistance to load and wear. In addition, the ceramic layer has a higher elastic modulus than the film of PPS. Therefore the ceramic layer is superior to the film of the PPS in the resistance to load.

BEST MODE FOR CARRYING OUT THE INVENTION

Figure 1:
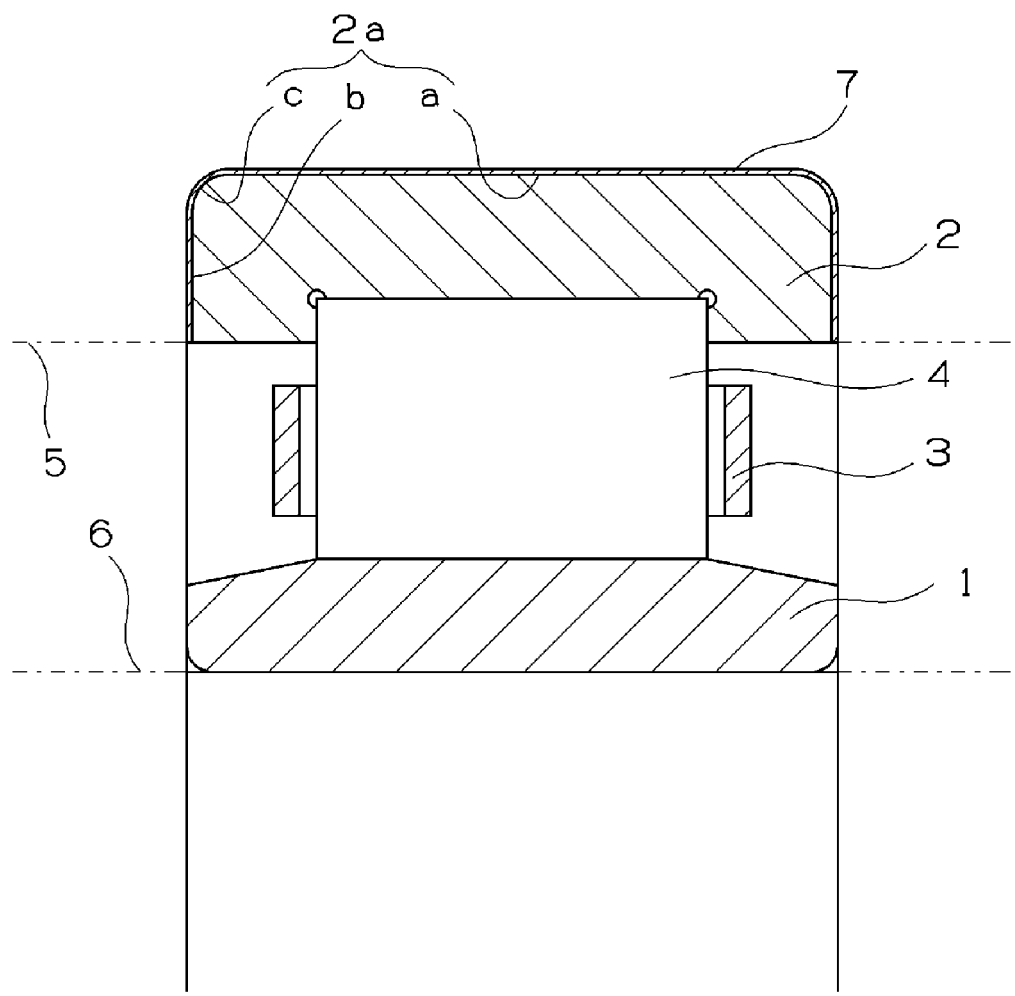
FIG. 1 is a sectional view showing an embodiment of a rolling bearing of the present invention.
Figure 2:
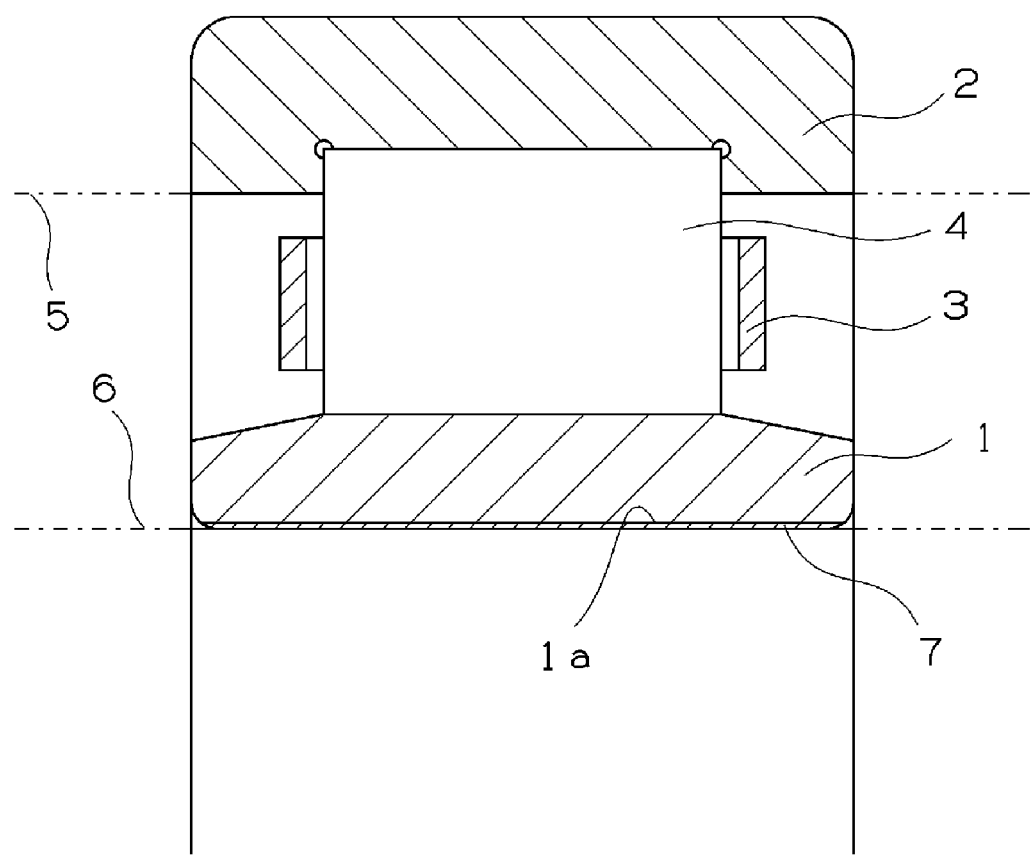
FIG. 2 is a sectional view showing another embodiment of a rolling bearing of the present invention.
Figure 3:
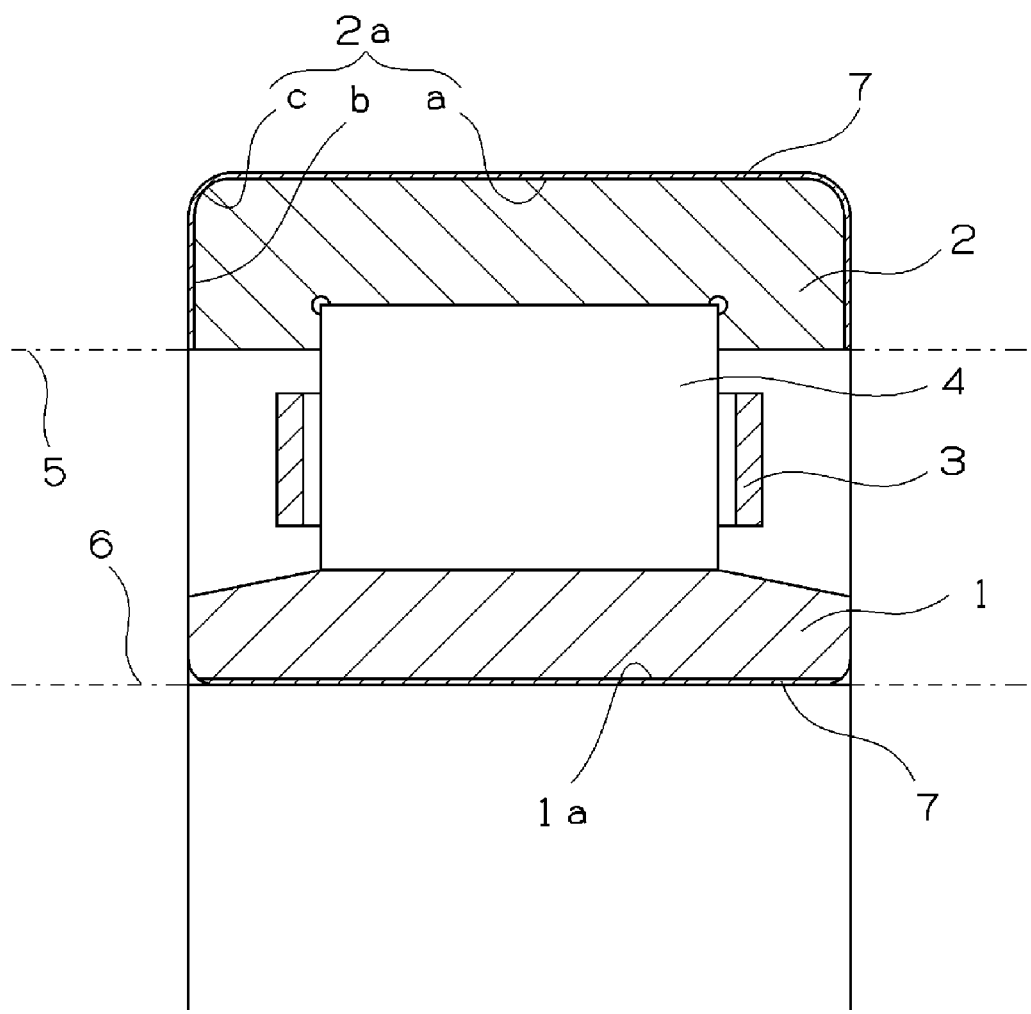
FIG. 3 is a sectional view showing still another embodiment of a rolling bearing of the present invention.
Figure 4:
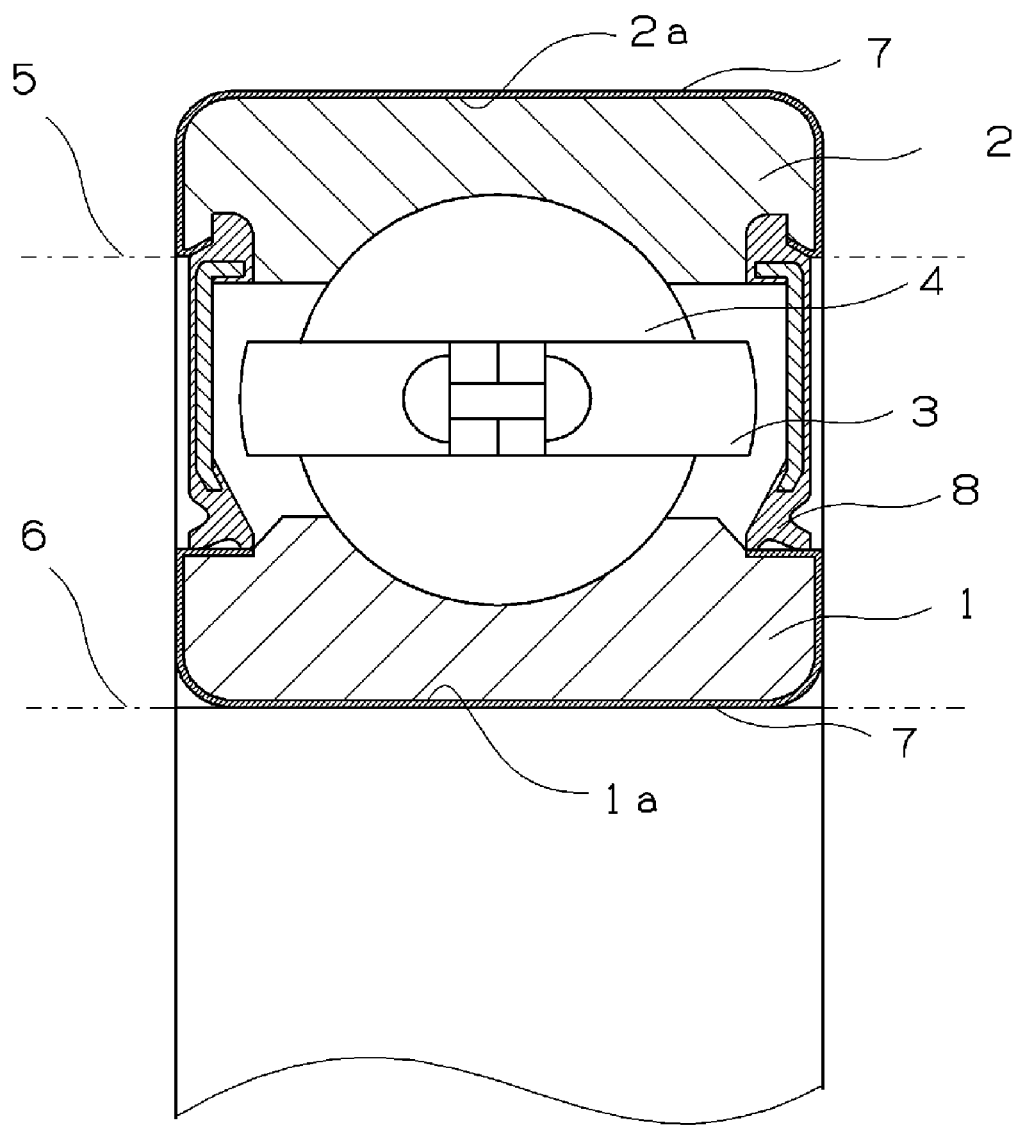
FIG. 4 is a sectional view showing a further embodiment of a rolling bearing of the present invention.

One embodiment of the rolling bearing of the present invention is described below with reference to FIG. 1. FIG. 1 is a sectional view of the rolling bearing in which a ceramic film is formed on a peripheral surface of an outer ring by the AD method. Although the ceramic film is as thin as several micrometers to several tens of micrometers, in FIG. 1 and FIGS. 2, 3, and 4 which are described later, the ceramic film is shown thicker than an actual thickness for the convenience of explanation. Rolling bearings shown in FIGS. 1, 2, and 3 are examples of an insulated rolling bearing having insulation performance. A rolling bearing shown in FIG. 4 is an example of a corrosion-resistant and chemical-resistant rolling bearing resistant to corrosion and chemicals such as acids and alkalis.

In the rolling bearing shown in FIG. 1, a plurality of rolling elements 4 retained by a retainer 3 is interposed between an inner ring 1 and an outer ring 2, the outer ring 2 is accommodated in a housing 5 or the like, and a shaft 6 is fixed to an inside diameter of the inner ring 1. A ceramic film 7 is formed on a peripheral surface 2a of the outer ring 2 by the AD method. The inner ring 1, the outer ring 2, and the rolling elements 4 are made of a metal material such as bearing steel.

In the present invention, the peripheral surface 2a of the outer ring 2 on which the ceramic film 7 is formed includes not only an outside surface a of the outer ring 2 but also an entire surface covering a range in which the housing 5 or the like holding the outer ring and the outer ring 2 contact each other. In the example shown in FIG. 1, the peripheral surface 2a of the outer ring 2 covers the range from the outside surface a of the outer ring 2 to an end panel b thereof, thus including a chamfered portion c.

The ceramic film 7 may be formed on an inner peripheral surface 1a of the inner ring 1 in addition to the peripheral surface 2a of the outer ring 2. Other embodiments of the rolling bearing of the present invention are described below with reference to FIGS. 2 and 3. In the example shown in FIG. 2, the ceramic film 7 is formed on the inner peripheral surface 1a of the inner ring 1. In the example shown in FIG. 3, the ceramic film 7 is formed on the peripheral surface 2a of the outer ring 2 and the inner peripheral surface 1a of the inner ring 1. In the present invention, the inner peripheral surface 1a of the inner ring 1 includes the entire surface covering a range in which the inner ring 1 and the shaft 6 contact each other. In the examples shown in FIGS. 2 and 3, the inner peripheral surface 1a of the inner ring 1 is the inside surface of the inner ring 1.

As described above, the insulation performance is held by forming the ceramic film on at least one of the entire surface covering a range in which the outer ring and the housing or the like contact each other and the entire surface covering a range in which the inner ring and the shaft or the like contact each other.

In the rolling bearing shown in FIG. 4, a plurality of rolling elements 4 retained by a retainer 3 is interposed between an inner ring 1 and an outer ring 2. A sealing member 8 for sealing grease enclosed on the periphery of the rolling elements 4 is provided at openings disposed at both ends of the inner ring 1 and the outer ring 2 in the axial direction thereof. The outer ring 2 is fixed to the housing 5, and the shaft 6 is fixed to the inside diameter of the inner ring 1. The ceramic film 7 is formed by the AD method on a contact surface 1a of the inner ring 1 and a contact surface 2a of the outer ring 2. A space that contacts various corrosive substances is constructed by the contact surface 1a, the contact surface 2a, the rotating shaft 6, the sealing member 8, and the housing 5. The inner ring 1 and the outer ring 2 are made of a metal material such as bearing steel.

The surfaces of the inner ring 1 and the outer ring 2 on which the ceramic film 7 is formed are such portions in a surface of the inner ring including the inner peripheral surface and in a surface of the outer ring including the peripheral surface that the portions contact at least a corrosive substance. The portions contacting a corrosive substance include a portion which directly contacts or may contact a corrosive substance.

In the present invention, the AD method is a method of dispersing aerosol consisting of fine particles of ceramics serving as a material in a gas, injecting the aerosol to a base material such as an inner ring, an outer ring or the like from an aerosol injection nozzle, and crashing the aerosol into the surface of the base material at a high speed to form a film consisting of the fine particles on the base material. Because the ceramic fine particles are pulverized by the collision, forms a new clean surface, and joined with one another at a low temperature, fine particles can be joined to one another at a room temperature.

In the aerosol, the ceramic fine particles maintain a dispersed state. The film obtained by the thermally spraying method is porous. On the other hand, because as described above, the film obtained by the AD method is formed from the fine particles dispersed as the aerosol, the film obtained by the AD method forms a very dense ceramic layer.

Therefore in an insulated rolling bearing such that a ceramic film is formed by the AD method on the inner peripheral surface of the inner ring and the peripheral surface of the outer ring, even though the surfaces are exposed to rain or deposited dew, the surfaces are protected by the ceramic layer not having water-permeable pores. Therefore the insulated rolling bearing is not energized nor an insulation resistance drops. In a corrosion-resistant and chemical-resistant rolling bearing in which the film is formed on the contact surface of the inner ring and the contact surface of the outer ring which contact corrosive substances, even though the corrosion-resistant and chemical-resistant rolling bearing is exposed to the corrosive substances such as acids, alkalis, and the like, the corrosion-resistant and chemical-resistant rolling bearing is protected by the ceramic layer not having pores into which the corrosive substances are capable of permeating. Therefore the corrosive substances do not penetrate into the foundation of the base material, which does not deteriorate the corrosion-resistant and chemical-resistant properties.

Because the ceramic film obtained by using the AD method is dense and excellent in its insulating and corrosion-resistant and chemical-resistant properties, the thickness of the film necessary for securing predetermined insulating and corrosion-resistant and chemical-resistant properties can be made smaller than the thickness of the film obtained by the thermally spraying method.

In the present invention, as ceramic fine particles serving as the material of the aerosol for forming the ceramic film by using the AD method, ceramic fine particles of oxides such as alumina, zirconia, titania, and the like favorable in the insulating and corrosion-resistant and chemical-resistant properties are listed. The lower is a true specific gravity of ceramics in a high-purity grade thereof, the more easily the ceramics can be transformed into the aerosol. Thus alumina fine particles are preferable.

The average particle diameter of alumina fine particles that can be used in the present invention is 0.01 μm to 2 μm. If the average particle diameter thereof is less than 0.01 μm, the alumina fine particles are liable to aggregate and it is difficult to transform them into the aerosol. If the average particle diameter thereof is more than 2 μm, a film cannot be formed (film growth does not occur) by using the AD method.

As methods for adjusting the diameter of the alumina fine particles, it is possible to exemplify a method of forming fine particles having diameter not more than several tens of nanometers by using chemical methods such as an alcoxide method, a colloid method, a pyrolytic method of ammonium alum, a pyrolytic method of ammonium aluminum carbonate, an improved Bayer process, an ethylene chlorohydrin method; and physical methods such as a method of evaporating the alumina fine particles in a gas, a sputtering (gas phase oxidation) method, an aluminum spark discharge method in water, and the like and heating the obtained fine particles to aggregate them into secondary particles having a diameter of about several hundreds of nanometers. To preferably form the film, it is preferable to form cracks in advance by using a ball mill, a jet mill or the like so that when the alumina fine particles collide with the base material, they can be easily pulverized.

Because in the AD method, high-temperature treatment is unnecessary unlike the thermally spraying method, the insulating property does not deteriorate because ceramics serving as the material of the aerosol are not exposed to high temperatures and does not transform. For example, in the thermally spraying method, even though α alumina having an excellent insulating property is used, the α alumina transforms into γ alumina having a low insulating property. Thus it is necessary to increase the film thickness. On the other hand, when the α alumina is used in the AD method, film can be formed from the α alumina having a high insulation performance without the transformation of the γ alumina. Therefore the ceramic layer having a high insulation performance can be obtained.

In the bearing in which the surface of the inner ring and that of the outer ring are coated with the ceramic layer formed by using the AD method, the ceramic layer has a higher hardness than the film of PTFE resin. Thus the ceramic layer has a high resistance to load and wear. In addition, the ceramic layer has a higher elastic modulus than the film of PPS. Therefore the ceramic layer is superior to the film of PPS in the resistance to load.

The method of the present invention for manufacturing the rolling bearing includes the step of forming the ceramic film on predetermined surfaces of the inner and outer rings of the rolling bearing by using the AD method.

As the method for forming the ceramic film by using the AD method, it is possible to adopt both a method of forming the film by moving an aerosol injection nozzle with the rolling bearing kept stationary or a method of forming the film by moving the rolling bearing with the aerosol injection nozzle kept stationary.

Of these methods, it is preferable to use the latter method because in the latter method, the aerosol can be sprayed in a stable state and ceramic films can be easily deposited on a predetermined surface of the inner ring of the rolling bearing or the outer ring thereof one over the other by using a positioning XY table and a motor for rotating an object in combination and axially moving, while the inner ring of the rolling bearing or the outer ring thereof is being rotated.

Figure 5:
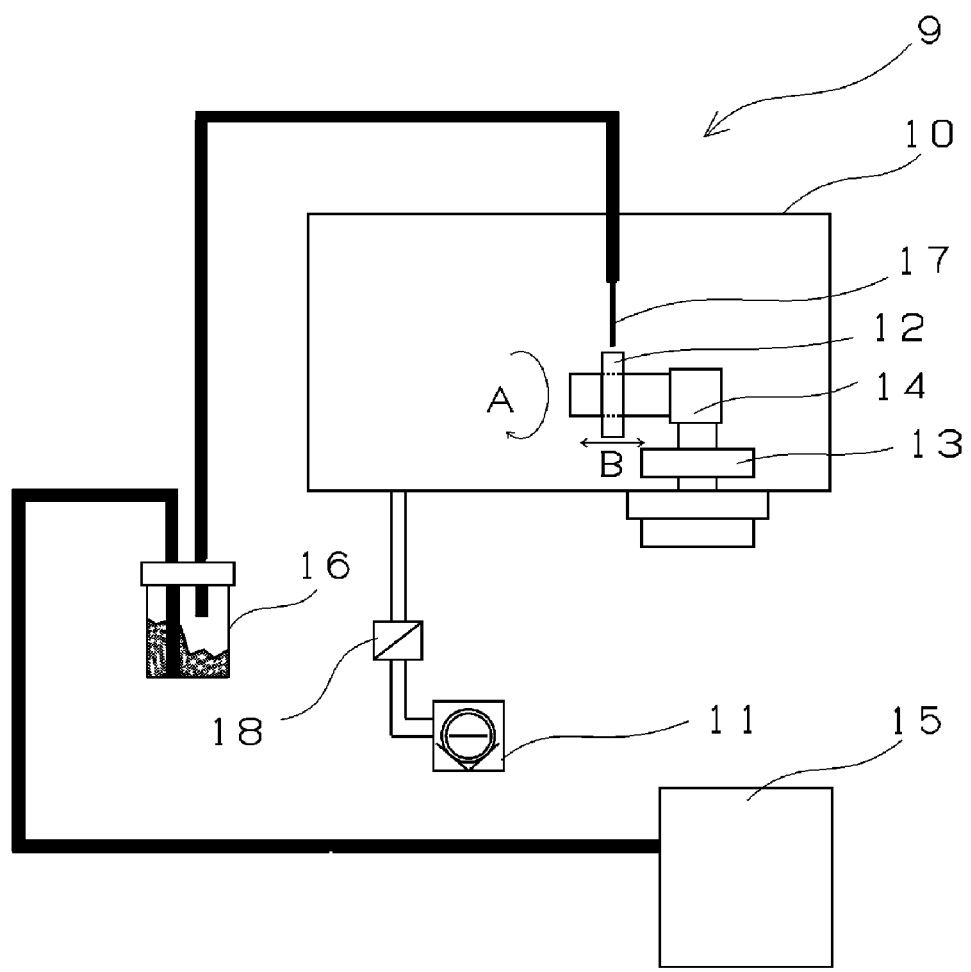
FIG. 5 shows an apparatus for forming a ceramic film by using an AD method.

The AD method of the present invention is described below with reference to FIG. 5. FIG. 5 shows a ceramic film-forming apparatus for forming a ceramic film by using the AD method. As shown in FIG. 5, a ceramic film-forming apparatus 9 for forming the ceramic film by using the AD method has a vacuum chamber 10. Inside the vacuum chamber 10, an outer ring of a rolling bearing or an inner ring 12 thereof on which a ceramic film is to be formed and an aerosol injection nozzle 17 are disposed. Aerosol is supplied into the aerosol injection nozzle 17 from an aerosol-generating device 16. The inside of the vacuum chamber 10 is depressurized by a vacuum pump 11. To prevent ceramic fine particles from penetrating into the vacuum chamber 10, a fine particle filter 18 is provided immediately before the vacuum pump 11. Inside the vacuum chamber 10, the outer ring or the inner ring 12 is rotated (A of FIG. 5) by a motor 14 for rotating an object and moved (B in FIG. 5) axially by a positioning XY table 13.

The aerosol injection nozzle 17 injects ceramic fine particles from a tip thereof having an aperture rectangular or having other configurations to at least one surface selected from among the inner peripheral surface of the inner ring and the peripheral surface of the outer ring. The number of the aerosol injection nozzles 17 may be one or plural. The aerosol injection nozzle 17 may be so constructed that it is displaceable inside the vacuum chamber 10.

As a carrier gas for the aerosol, an inactive gas is used and supplied to the aerosol-generating device 16 from a gas supply equipment 15. As inactive gas that can be used, argon, nitrogen, helium, and the like are listed.

The aerosol of the ceramic fine particles is injected from the stationary aerosol injection nozzle 17 to the outer ring or the inner ring 12 being rotated at a predetermined number of rotations by the motor 14 for rotating an object. As a result, the ceramic films are deposited one over the other on the peripheral surface of the outer ring or the inner peripheral surface of the inner ring. At the same time, the outer ring or the inner ring 12 is axially moved by the positioning XY table 13. Thereby the film is uniformly formed on each peripheral surface in an axial direction thereof.

It is preferable to continue the formation of the film until the thickness thereof becomes about 4 μm. Although the thickness of the film is different according to the use of the bearing, the thickness thereof is preferably 4 μm to 200 μm. If the thickness thereof is less than 4 μm, a sufficient insulation resistance cannot be obtained. If the thickness thereof is more than 200 μm, the manufacturing cost becomes high.

EXAMPLES

Example 1

The insulated rolling bearing shown in FIG. 1 was formed to use it as a specimen bearing (NU214, outer diameter of outer ring: φ125 mm, width of outer ring: 24 mm). A film 7 consisting of alumina fine particles was formed on a peripheral surface 2a of an outer ring 2 by using the AD method. In the AD method, by using a bearing-driving apparatus in which a positioning XY table and a motor for rotating an object were used in combination, aerosol consisting of the alumina fine particles was injected under a reduced pressure of not more than 100 Pa from a nozzle having an aperture size of 5 mm×0.3 mm onto the peripheral surface of the outer ring which moved axially while rotating at a peripheral speed of 6 mm/minute to form a film thereon. The film formation operation continued until the thickness thereof became 4 μm.

As the alumina fine particles, Taimicron TM-DAR produced by Taimei Chemicals Co., Ltd. was used. The average diameter thereof was 0.16 μm. The alumina fine particles were used by heating them under a reduced pressure of not more than 10 Pa so that they were dry. As a carrier gas, helium was used. The particle speed was controlled by the amount of the carrier gas.

It could be confirmed that in the obtained specimen bearing, a predetermined insulation resistance (when not less than 10 MΩ/500V was applied) was obtained between the inner peripheral surface of the outer ring and the peripheral surface of the outer ring.

Example 2

The insulated rolling bearing shown in FIG. 2 was formed to use it as a specimen bearing. The film 7 consisting of alumina fine particles was formed on an inner peripheral surface 1a of an inner ring 1 by using the AD method. In the AD method, by using a bearing-driving apparatus in which a positioning XY table and a motor for rotating an object were used in combination, aerosol consisting of the alumina fine particles was injected under a reduced pressure of not more than 100 Pa from a nozzle having an aperture size of 5 mm×0.3 mm onto the inner peripheral surface of the inner ring which moved axially while rotating at a peripheral speed of 6 mm/minute to form a film thereon. The film formation operation continued until the thickness thereof became 4 μm.

The same alumina fine particles as that used in the example 1 was used. It could be confirmed that in the obtained specimen bearing, a predetermined insulation resistance (when not less than 10 MΩ/500V was applied) was obtained between the inner peripheral surface of the outer ring and the peripheral surface of the outer ring.

Example 3

The insulated rolling bearing shown in FIG. 3 was formed to use it as a specimen bearing. A film 7 consisting of alumina fine particles was formed on the peripheral surface 2a of an outer ring 2 and the inner peripheral surface 1a of the inner ring 1 by using the AD method. In the AD method, by using a bearing-driving apparatus in which a positioning XY table and a motor for rotating an object were used in combination, aerosol consisting of the alumina fine particles was injected under a reduced pressure of not more than 100 Pa from a nozzle having an aperture size of 5 mm×0.3 mm onto the peripheral surface of the outer ring which moved axially while rotating at a peripheral speed of 6 mm/minute to form a film thereon. The film formation operation continued until the thickness thereof became 4 μm. Similarly a film was also formed on the inner peripheral surface of the inner ring.

The same alumina fine particles as that used in the example 1 was used. It could be confirmed that in the obtained specimen bearing, a predetermined insulation resistance (when not less than 10 MΩ/500V was applied) was obtained between the inner peripheral surface of the outer ring and the peripheral surface of the outer ring.

Example 4

The insulated rolling bearing shown in FIG. 4 was formed to use it as a specimen bearing. A film 7 consisting of alumina fine particles was formed on the contact surface 1a of the inner ring 1 and the contact surface 2a of the outer ring 2 by using the AD method. In the AD method, by using a bearing-driving apparatus in which a positioning XY table and a motor for rotating an object were used in combination, aerosol consisting of the alumina fine particles was injected under a reduced pressure of not more than 100 Pa from a nozzle having an aperture size of 5 mm×0.3 mm onto the contact surface 1a of the inner ring 1 and the contact surface 2a of the outer ring 2 both of which moved axially while rotating at a peripheral speed of 6 mm/minute to form a film thereon. The film formation operation continued until the thickness thereof became 4 μm.

As the alumina fine particles, Taimicron TM-DAR produced by Taimei Chemicals Co., Ltd. was used. The average diameter thereof was 0.16 μm. The alumina fine particles were used by heating them under a reduced pressure of not more than 10 Pa so that they were dry. As a carrier gas, helium was used. The particle speed was controlled by the amount of the carrier gas.

The obtained specimen bearings were immersed in chemicals and rotated at 2000 rpm for 20 hours. Two kinds of chemicals were used in the test. One of the two chemicals was 20 wt % water solution of sodium hydroxide and the other was 20 wt % water solution of sulfuric acid. After the test finished, the surfaces of the bearings were visually checked. The result was that no corrosion or damage was admitted in both chemicals. Although the films were as thin as 4 μm, the bearings showed excellent resistance to corrosion and chemicals.

Industrial Applicability

In the rolling bearing of the present invention, the ceramic film is formed on at least one surface selected from among the inner peripheral surface of the inner ring and the peripheral surface of the outer ring by using the AD method. In the obtain dense film, the surface of the film and the foundation of the bearing ring are not interconnected with each other. Thus the rolling bearing maintains a high insulation performance. Therefore the rolling bearing of the present invention can be preferably utilized as a rolling bearing for preventing the occurrence of galvanic corrosion and an insulated rolling bearing for use in various industrial machines such as a general-purpose motor, an electric generator, a main electric motor of a railway vehicle, and the like all of which are so constructed that electric current flows through the inside of a bearing. The ceramic film is formed on the surface of the inner ring and the outer ring which contacts at least the corrosive substance. Thus the rolling bearing is capable of maintaining a high resistance to corrosion and chemicals. Therefore the rolling bearing can be preferably utilized as the corrosion-resistant and chemical-resistant bearing which can be used in environment of a chemical plant and the like where metal is liable to be corroded owing to contact between the metal and chemicals such as acids, alkalis, and the like.

The invention claimed is:

1. A rolling bearing comprising an inner ring, an outer ring, and a plurality of rolling elements provided between a raceway surface of said inner ring and a raceway surface of said outer ring, said rolling bearing has a ceramic film formed on at least one surface selected from among an inner peripheral surface of said inner ring and a peripheral surface of said outer ring, wherein said inner ring and said outer ring comprise a metal material, wherein said ceramic film is formed by using an aerosol deposition method to form said ceramic film as a dense film that does not have pores that interconnect a surface of said ceramic film with said at least one surface selected from among an inner peripheral surface of said inner ring and a peripheral surface of said outer ring in order to prevent corrosive material from travelling through said ceramic film, and wherein said ceramic film is formed by using fine alumina particles of α alumina as a material of aerosol.

2. The rolling bearing according to claim 1, wherein said ceramic film is formed on surface portions of said inner ring and said outer ring which are exposed to a corrosive substance; and a sealing member is provided at openings disposed at both ends of said inner ring and said outer ring in an axial direction thereof.

3. The rolling bearing according to claim 2, wherein said ceramic film is formed at a portion where said sealing member contacts said inner ring and said outer ring.

4. The rolling bearing according to claim 1, wherein an average diameter of said fine particles of α alumina is 0.01 μm to 2 μm.

5. The rolling bearing according to claim 1, wherein a thickness of said ceramic film is 4 μm to 200 μm.

6. A method for manufacturing a rolling bearing comprising an inner ring, an outer ring, and a plurality of rolling elements provided between a raceway surface of said inner ring and a raceway surface of said outer ring;

said method comprising a step of forming a ceramic film on at least one surface selected from among an inner peripheral surface of said inner ring and a peripheral surface of said outer ring by using an aerosol deposition method, wherein said ceramic film is formed using the aerosol deposition method as a dense film that does not have pores that interconnect a surface of said ceramic film with said at least one surface selected from among an inner peripheral surface of said inner ring and a peripheral surface of said outer ring in order to prevent corrosive material from travelling through said ceramic film, and wherein said ceramic film is formed by using fine alumina particles of α alumina as a material of aerosol.

7. The method according to claim 6 for manufacturing a rolling bearing, wherein said ceramic film is formed by using said aerosol deposition method, with an aerosol injection nozzle kept stationary and said inner ring or said outer ring being rotated by using a motor, said inner ring or said outer ring is moved axially by using a positioning XY table.

8. The method according to claim 6 for manufacturing a rolling bearing, wherein said inner ring and said outer ring comprise a metal material.

* * * * *